(12) United States Patent
Yamanoi et al.

(10) Patent No.: US 7,139,229 B2
(45) Date of Patent: Nov. 21, 2006

(54) OPTICAL DISK IDENTIFICATION CIRCUIT

(75) Inventors: Koyu Yamanoi, Funabashi (JP); Toshio Yamauchi, Tsuzuki Ku Yokohama (JP); Hironobu Murata, Hodogaya Ku Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 614 days.

(21) Appl. No.: 10/085,742

(22) Filed: Feb. 26, 2002

(65) Prior Publication Data

US 2002/0181370 A1 Dec. 5, 2002

(30) Foreign Application Priority Data

Mar. 2, 2001 (JP) .............................. 2001-059275

(51) Int. Cl.
*G11B 7/00* (2006.01)

(52) U.S. Cl. .................................. 369/53.22; 369/53.2

(58) Field of Classification Search ............... 369/53.2, 369/53.22, 53.23
See application file for complete search history.

(56) References Cited

U.S. PATENT DOCUMENTS

| | | | |
|---|---|---|---|
| 4,572,965 A * | 2/1986 | Yamamura .................. 307/130 |
| 6,249,494 B1 * | 6/2001 | Ueki ........................ 369/44.27 |
| 6,262,957 B1 * | 7/2001 | Inoue et al. ............. 369/53.23 |
| 6,278,672 B1 * | 8/2001 | Kobayashi ............... 369/53.23 |
| 6,288,987 B1 * | 9/2001 | Kumagai .................. 369/44.29 |
| 6,466,531 B1 * | 10/2002 | Lee ............................ 369/53.2 |
| 6,487,153 B1 * | 11/2002 | Kamiyama et al. ...... 369/53.23 |
| 6,603,720 B1 * | 8/2003 | Kuroda et al. ........... 369/53.23 |
| 6,747,931 B1 * | 6/2004 | Park ........................ 369/53.23 |
| 6,822,936 B1 * | 11/2004 | Ono et al. ............... 369/53.23 |

* cited by examiner

*Primary Examiner*—Thang V. Tran
*Assistant Examiner*—Adam R. Giesy
(74) *Attorney, Agent, or Firm*—Carlton H. Hoel; W. James Brady, III; Frederick J. Telecky, Jr.

(57) ABSTRACT

The present invention offers an optical disk determination circuit that can improve the stability of the operation to detect the peak (pulse signal) of the received light signal, and that can improve the stability of the optical disk determination operation. When determining the type of optical disk corresponding to the depth from the surface of the plane on which a light beam is irradiated to the data recording layer, light is irradiated while varying the focal position of the light beam at a constant velocity in one direction of the depth direction from the surface of the optical disk. The bottom level of the received light signal corresponding to the intensity of this reflected light is clamped at a specified level by the bottom clamp circuit 43. The received light signal with the bottom level clamped is compared with a specified reference voltage Vref by the comparator 45, and the received light signal peak (pulse signal) is detected corresponding to the results of this comparison. The type of optical disk is determined by measuring the difference in this peak (pulse signal) detection time.

4 Claims, 4 Drawing Sheets

FIG. 4a
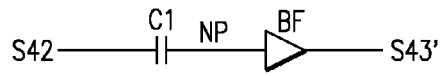
FIG. 4b
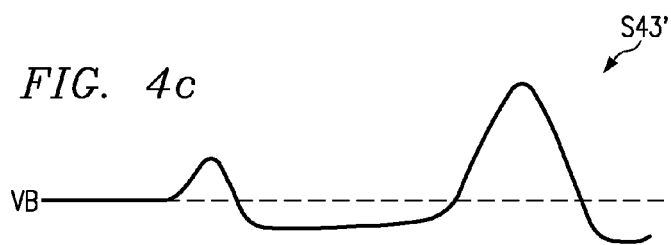
FIG. 4c
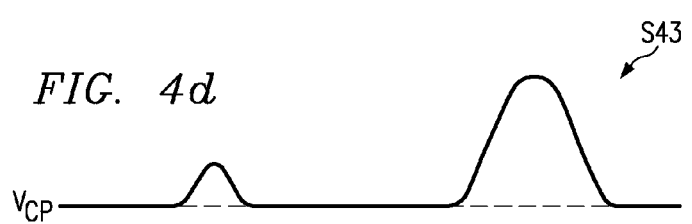
FIG. 4d

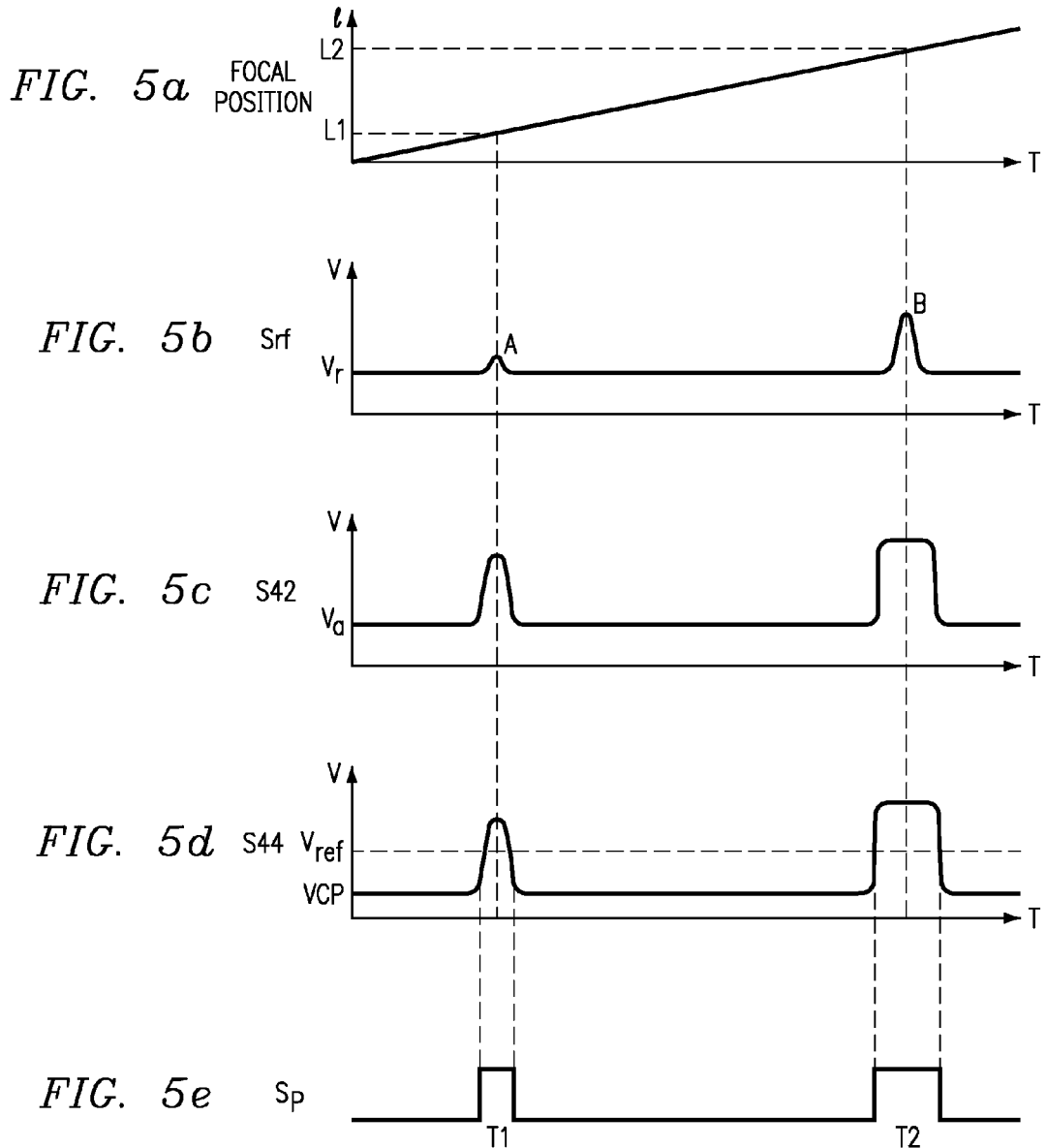
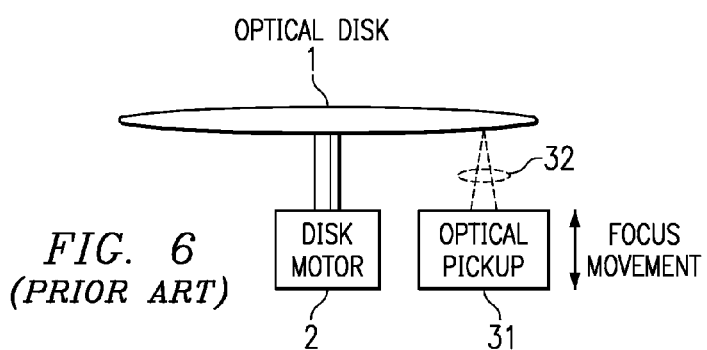
FIG. 6 (PRIOR ART)

OPTICAL DISK IDENTIFICATION CIRCUIT

FIELD OF THE INVENTION

The present invention is related to an optical disk determination circuit that is used in order to determine the type of optical disk, such as a CD or DVD, in which there are differences in the depth from the surface of the disk plane, which is irradiated with laser light to the data recording layer.

BACKGROUND OF THE INVENTION

Optical disk playback devices, for example, DVD (Digital Versatile Disk) players, have been spreading rapidly in recent years, and are being equipped with generalized functions that can play back other types of optical disks, specifically, functions that can play back CDs (Compact Disks), which have already become widespread. This kind of optical disk playback device is normally equipped with a function to determine the type of optical disk that is loaded in the equipment, and suitable playback processing or recording processing is conducted corresponding to the type determined.

In general optical disks, a long narrow convex part called a pit, which has a length corresponding to the recorded data, is arranged in a spiral by making a circumferential row from the center in the recording layer of a disk that is irradiated by laser light. When reading the recorded data from the optical disk, laser light is irradiated on this pit row.

A transparent substrate such as a resin is formed on the upper layer of this recording layer, the incident laser light is reflected by the previously described recording layer through this transparent substrate, and the recorded data is played back by using an optical detector to convert the reflected light to electrical signals.

The general method to determine whether an optical disk is a CD or DVD is to detect the thickness of this transparent substrate. Specifically, while the thickness of the transparent substrate in a CD is 1.2 mm, that in a DVD is half that thickness or 0.6 mm. Therefore, whether an optical disk is a CD or DVD can be determined by detecting the difference in this thickness.

FIG. 6 is a diagram to explain the general method to determine the type of optical disk. Indicated in the diagram are a disk motor 2 that clamps and rotates an optical disk 1, and an optical pickup 31 that focuses and irradiates laser light on a specific position on the optical disk 1, and that receives and converts that reflected light into electrical signals.

In the optical disk determination method indicated in FIG. 6, first, the optical pickup 31 is moved by an activator (not indicated in the diagram) at a constant velocity perpendicular to the surface of the disk while laser light is irradiated on the optical disk 1. By doing this, the focal position (focus) of the laser light is moved at a constant velocity perpendicular to the surface of the optical disk.

In conjunction with moving this focal position, several peaks are generated in the electrical signals (called the received light signals hereinafter) corresponding to the intensity of the reflected light converted by the optical pickup 31. For example, when the focal position is moved in the direction from the surface of the disk to the recording layer, the intensity of the reflected light first increases when the focal position reaches the disk surface and a first peak is generated in the received light signal based on the transparent substrate. Next, a second peak is generated in the received light signal when the focal position arrives at the recording layer. The distance between the disk surface and the recording layer is derived by using, for example, a time counter to measure the time interval generated between these first and second peaks. Whether an optical disk is a CD or DVD is determined by this measured time or distance.

In this regard, the peak value in the received light signal generated from reflection by the disk surface is extremely small compared to the peak value generated from reflection by the recording layer. Therefore, sometimes the effects of noise, etc. cause errors to be generated when detecting this extremely small peak value, and the disk determination operation becomes unstable.

FIG. 7 is a schematic block diagram indicating one example of a conventional received light signal detection circuit to detect light reflected from the surface of the optical disk and light reflected from the recording layer. In FIG. 7, the code 11 is a low-pass filter, the codes 12 and 13 are amplifiers, the codes 14 and 15 are peak retention circuits, the code 16 is a voltage division circuit, and the code 17 is a comparator.

The low-pass filter 11 is a filter to attenuate the high frequency noise component, which is outside a specified signal pass band, from the received light signal Srf.

The signals with the noise component attenuated by the low-pass filter 11 are input into the amplifier 12, and are amplified by a specified gain.

The amplifier 13 amplifies by a specified gain the signals from the amplifier 12 that are input via the capacitor C2.

The peak hold circuit 14 retains at a specified droop rate the maximum level peak of the amplified signal S13 that is input from the amplifier 13.

The peak hold circuit 15 retains at a specified droop rate the minimum level peak of the amplified signal S13 that is input from the amplifier 13.

The voltage division circuit 16 divides at a specified voltage division ratio the voltage of the maximum level of the amplified signal S13, which is retained by the peak holder circuit 14, and the voltage of the minimum level of the amplified signal S13, which is retained by the peak holder circuit 15. Normally, the voltage is divided to an intermediate level between the maximum and minimum levels.

The comparator 17 compares the level of the amplified signal S13 input from the amplifier 13 with that of the threshold signal S16 input from the voltage division circuit 16. If the level of the amplified signal S13 is greater than the level of the threshold signal S16, then the comparator 17 outputs a detection signal Sp of the logical value "1" that indicates detection of a peak.

The high frequency noise component of the received light signal Srf input into the low-pass filter is removed; and this signal is amplified by a specified gain by the amplifier 12, and is input into the capacitor C2. The amplified signal of the received light signal Srf, which has had the direct current component removed by this capacitor C2, is amplified by a specified gain by the amplifier 13, and is input respectively into the positive terminal of the comparator 17, the peak holder circuit 14, and the peak holder circuit 15.

The maximum level of the amplified signal S13 that is retained in the peak holder circuit 14 and the minimum level of the amplified signal S13 retained in the peak holder circuit 15 are divided by the voltage division circuit 16. The threshold signal S16, which has a level between these maximum and minimum levels, is input into the negative terminal of the comparator 17. The comparator 17 compares the levels of the amplified signal S13 with the threshold signal S16, and if the level of the amplified signal S13 exceeds that of the threshold S16, then a detection signal Sp of a logical value "1" is produced.

FIG. 8 is a diagram indicating examples of the waveforms of various parts in the optical disk determination circuit of FIG. 7.

In the received light signal Srf indicated in FIG. 8a, the peak A corresponds to the peak of the intensity of the light reflected by the disk surface, and the peak B corresponds to the peak of the intensity of the light reflected by the recording layer. As indicated in this diagram, the peak A caused by the surface of the disk is extremely small compared to the peak B caused by the recording surface.

Indicated in FIG. 8b is the waveform of the signal S13, wherein the peaks have been amplified by the amplifiers 12 and 13. The peaks are amplified by two amplifiers; the amplifiers output the saturated maximum level; and the maximum peak portions are flattened.

The maximum peak and minimum peak levels of the signal S13, obtained by amplifying the peaks of the received light signal Srf into a square wave shape, are retained respectively in the peak holder circuit 14 and the peak holder circuit 15. The voltage division circuit 16 generates the threshold signal S16, which has a nearly intermediate level between the two retained peaks. As indicated in FIG. 8c, the detection signal Sp is the high level when the level of this threshold signal S16 is less than the amplified signal S13, and is the low level when the level of this threshold signal S16 is greater than the amplified signal S13.

FIG. 9 is a diagram indicating the relationship between the signal waveforms input into the comparator of FIG. 7 and the logical threshold level of the comparator 17. In FIG. 9, the dotted line waveform of the threshold level indicates the logical threshold level that the input offset of the comparator 17 adds to the threshold signal S16. The logic of the detection signal Sp output from the comparator 17 is inverted if the amplified signal S13 exceeds this logical threshold level. Moreover, if no peak is generated in the amplified signal S13, the level of the threshold signal S16 is equivalent to that of the amplified signal S13 because the retention levels of the peak holder circuit 14 and the peak holder circuit 15 are equivalent to the level of the amplified signal S13. Consequently, in this case, the logical threshold level of the comparator 17 is only the input offset, and if a noise component that exceeds this input offset is added to the input of the comparator 17, there is the possibility that this will cause the detected signal Sp to be inverted to the logical value "1". Specifically, in a system that sets up a threshold level for detecting peaks using a maximum peak level and minimum peak level retained by peak holder circuits, there is the problem that it is highly possible that an optical disk determination error will be made because noise is prone to cause operational errors during periods in which no peak is input.

In the optical disk determination circuit indicated in FIG. 7, differential action by the capacitor C2 causes the input signal level of the amplifier 13 to fluctuate after generating the peak. If a level fluctuation is generated during the non-peak period, the threshold signal S16 will also change because the maintenance levels of the peak holder circuit 14 and the peak holder circuit 15 will change. The timing whereby the detection signal Sp turns from the logical value "0" to the logical value "1", as well as the period of the logical value "1" will change. Moreover, the timing whereby the detection signal Sp becomes the logical value "1" will become unstable, and the stability of the optical disk determination operation will be lost because the capacitance value of the capacitor C2 and the input impedance of the amplifier 13 will vary the size of this level fluctuation.

The present invention takes the related circumstances into consideration, and has the purpose of offering an optical disk determination circuit that, when determining the type of optical disk corresponding to the depth from the surface of the plane irradiated by the optical beam up to the data recording layer, can stably determine the type of optical disk by stably detecting the weak peak (pulse signal) of the received light signal corresponding to the intensity of the received light of the light reflected from the optical disk.

SUMMARY OF THE INVENTION

In order to achieve the aforementioned objectives, the present invention offers an optical disk determination circuit that determines the kind of optical disk by detecting the distance from the light beam irradiation plane to the data recording layer, comprising: an input terminal that inputs received light signals, which correspond to the reflected light of a light beam, while the focal position changes in the depth direction of an optical disk; a clamp circuit that clamps the bottom level of the aforementioned received light signals at a specified level, and outputs this as a bottom level clamp signal; a comparator circuit that detects a first reflection signal at the surface of the optical disk, and a second reflection signal at the recording layer of the optical disk by comparing the aforementioned bottom level clamp signal with a reference voltage; and a calculation circuit that calculates the distance from the surface of the optical disk to the recording layer using the time difference between the aforementioned first reflection signal and the aforementioned second reflection signal.

In addition, the optical disk determination circuit of the present invention may also have a filter circuit that conducts specified signal processing on signals that are input from the aforementioned input terminal, and an amplifier circuit that amplifies the output signals of the aforementioned filter circuit and outputs them to the aforementioned clamp filter. Further, the present invention may also have a filter circuit that conducts specified signal processing on the output signals of the aforementioned clamp circuit.

In addition, the optical disk determination circuit of the present invention determines whether an optical disk is a CD or a DVD corresponding to the distance from the surface of the optical disk to the recording layer.

EFFECTS OF THE INVENTION

According to the optical disk determination circuit of the present invention, when determining the type of optical disk corresponding to the depth from the surface of the plane irradiated by the optical beam to the data recording layer, noise, etc. has little influence on the detection of the weak peak (pulse signal) of the received light signal corresponding to the intensity of the light reflected from the optical disk. This improves the stability of peak (pulse signal) detection.

BRIEF DESCRIPTION OF THE DRAWINGS

FIG. 4 is a diagram for the purpose of explaining the characteristics of the clamp circuit indicated in FIG. 3.

FIG. 5 is a diagram indicating the waveforms of various parts of the detection circuit indicated in FIG. 2 in relation to the position of the focal position of the laser light.

FIG. 6 is a diagram for the purpose of explaining the general method of determining the type of optical disk.

DESCRIPTION OF EMBODIMENTS

A form of embodying the present invention will be explained below by referring to FIGS. 1 through 5.

Figure 1:
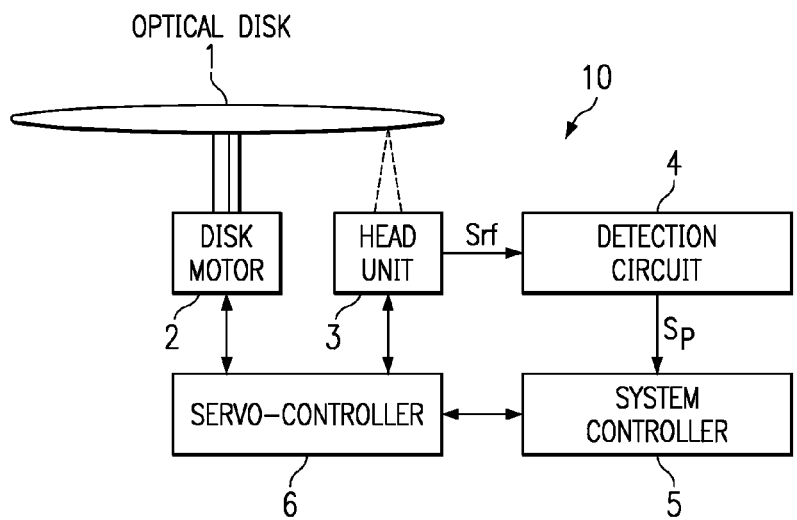
FIG. 1 is a schematic block diagram indicating one form of embodying an optical disk determination device related to the present invention.

FIG. 1 is a schematic block diagram indicating one form of embodying an optical disk determination device 10 relating to the present invention.

In FIG. 1, the code 1 indicates an optical disk; the code 2 is a disk motor; the code 3 is a head unit; the code 4 is a detection circuit; the code 5 is a system controller; and the code 6 is a servo-controller.

The disk motor 2 supports the loaded optical disk 1 such as a CD or DVD, and rotates the optical disk 1 at a rotational velocity controlled by the servo-controller 6.

The head unit 3 is provided with: an oscillator of laser light to be irradiated on various optical disks 1; an optical system that irradiates and receives laser light; an optical detector that detects light received by the optical system and converts it to electrical signals; a received light signal amplifier that amplifies signals from the light detector; and a circuit that produces focus error signals and tracking error signals from the amplified received light signals, and outputs them to the servo-controller 6. In this way, signals are generated wherein reflected light received when irradiating the optical disk 1 with laser light is converted to received light signals; the converted received light signals are amplified; and focus error signals and tracking error signals created from the amplified received light signals are used in server control. Also provided is an actuator that moves the optical system in the direction of the irradiated laser light as well as radially on the disk corresponding to the control signals from the servo-controller 6. By doing this, laser light is irradiated on the desired position of the optical disk 1, and that reflected light is received.

The detection circuit 4 detects the peak (pulse-shaped signal) of the received light signal Srf input from the head unit 3. This detection circuit 4 will be explained in detail later.

The servo-controller 6 controls the rotational velocity of the disk and the position of laser light irradiation by controlling the disk motor 2 and the actuator of the head unit 3. For example, when determining a loaded optical disk, the focal position (focus) of the light beam of the head unit 3 is raised or lowered at a constant velocity perpendicularly to the disk surface of the optical disk.

In addition, the actuator of the head unit 3 is servercontrolled corresponding to the focus error signals and tracking error signals input from the head unit 3, and laser light is irradiated on the desired position of the optical disk by correcting discrepancies in the focus of the laser light and in track scanning.

The system controller 5 conducts various kinds of control relating to the system as a whole such as: processing to determine the type of disk that is inserted using the time of peak generation detected by the detection circuit 4; and control of the servo-controller 6 to drive the actuator 2 and the head unit 3.

The operation of using the optical disk determination device having the composition described above to determine the type of optical disk will be explained.

When directions to scan the focal position are output from the system controller 5 to the servo-controller 6, laser light generated by the laser oscillator of the head unit 3 is irradiated on the laser irradiation surface of the optical disk 1 through the inner optical system. In conjunction with this, the actuator of the head unit 3 is used to move the focal position of the laser light at a constant velocity in the depth direction of the disk. By doing this, the focal position of the laser light is moved at a constant velocity perpendicular to the surface of the optical disk.

In conjunction with this movement of the focal position, several peaks are generated in the received signal that is converted by the optical detector of the head unit 3. For example, when the focal position is moved in the direction from the surface of the disk to the recording layer, the intensity of the reflected light first increases when the focal position reaches the disk surface and a first peak (first reflected signal) is generated in the received light signal based on the transparent substrate. Next, a second peak (second reflected signal) is generated in the received light signal when the focal position arrives at the recording layer. The detection signal Sp of the detection circuit 4 is input into the system controller 5, and the time interval generated between the first peak and the second peak is measured using, for example, a timer counter. The distance between the disk surface and the recording layer is derived from this measured time interval, and whether the optical disk is a CD or DVD is determined corresponding to this distance.

Figure 2:
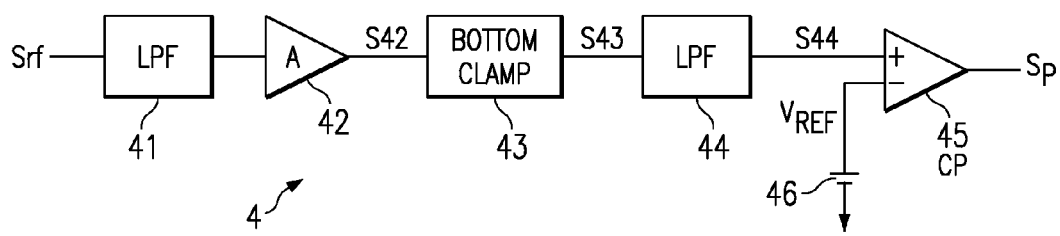
FIG. 2 is a schematic block diagram indicating one form of embodying the detection circuit related to the present invention.

FIG. 2 is a schematic block diagram indicating the first form of embodying the detection circuit 4 related to the present invention.

In the detection circuit 4 indicated in FIG. 2, the code 41 indicates a low-pass filter; the code 42 is an amplifier; the code 43 is a bottom clamp circuit; the code 44 is a low-pass filter; the code 45 is a comparator; and the code 46 is a reference voltage source.

The low-pass filter 41 is a filter that attenuates the high frequency noise component outside the specified signal pass band from the received light signal Srf.

The signal from which the noise component was attenuated by the low-pass filter 41 is input into the amplifier 42, and the signal is amplified by the specified gain.

The bottom clamp circuit 43 is a circuit that converts to the specified clamp level the bottom level of the amplified signal S42 from the amplifier circuit 42. Specifically, the bottom level is the minimum level to which the intensity of the reflected light from the optical disk may drop in the polar direction. Even if the bottom level of the amplified signal S42 fluctuates, the bottom clamp circuit 43 fixes the bottom level of the output signal S43 at this clamp level.

Here, the details of the bottom clamp circuit 43 will be explained while referring to FIGS. 3 and 4.

Figure 3:
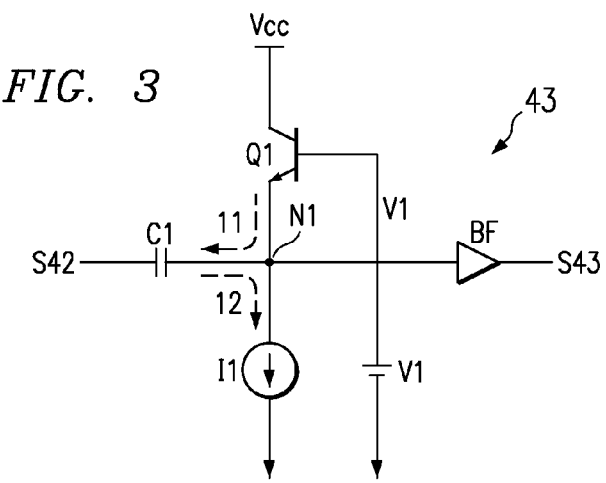
FIG. 3 is a schematic circuit diagram indicating one example of the bottom clamp circuit.
Figure 7:
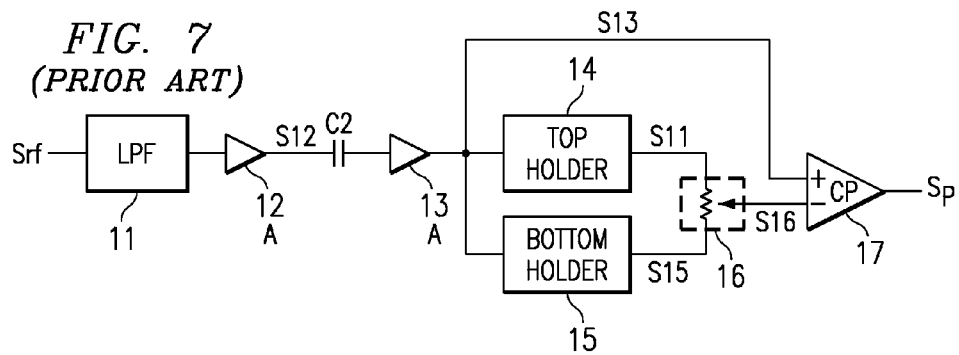
FIG. 7 is a schematic block diagram indicating one example of a conventional detection circuit to detect the peak of the received light signal.
Figure 8A:
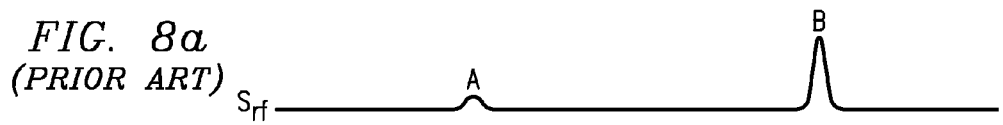
FIG. 8 is a diagram indicating examples of the waveforms of various parts in the detection circuit of FIG. 7.
Figure 8B:
Figure 8C:
Figure 9:
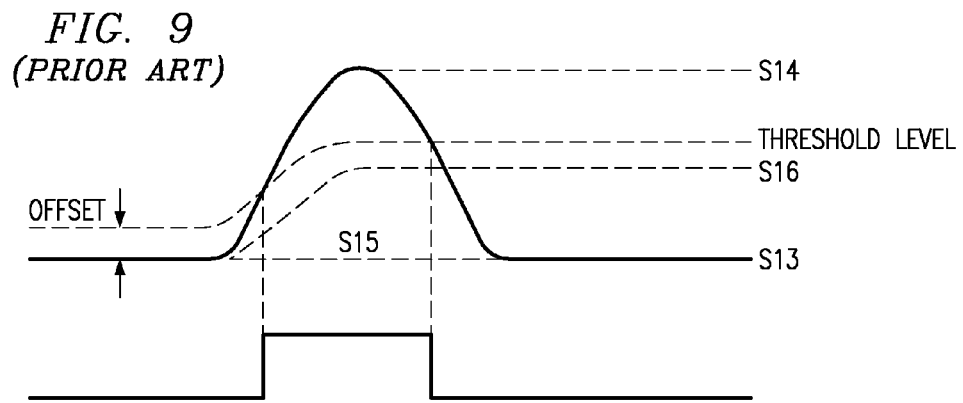
FIG. 9 is a diagram indicating the relationship between the various signal waveforms input into the comparator of FIG. 7 and the logical threshold level of this comparator.

FIG. 3 is a schematic circuit diagram indicating one example of the bottom clamp circuit 43. The code C1 indicates a capacitor; the code Q1 is an NPN transistor; the code N1 is a node; the code I1 is a constant current circuit; the code V1 is a constant voltage circuit; and the code BF is a buffer circuit.

The amplified signal S42 from the amplifier 42 is input into one terminal of the capacitor C1, and the other terminal is connected to the node N1.

The collector of the NPN transistor Q1 is connected to the power source voltage Vcc; the base is secured to a constant voltage v1 from the constant voltage circuit V1; and the emitter is connected to the node N1.

The constant current circuit I1 supplies a constant current I1 from the node N1 to the ground potential.

The signal of the node N1 is input into the buffer circuit BF at a high input impedance, and the signal S43 corresponding to the input signal is output.

The base of the NPN transistor Q1 is secured to a fixed voltage v1 using the fixed voltage circuit V1. For this reason, if the voltage vn1 of the node N1 drops and causes the difference between the voltage v1 and the voltage vn1 to become greater than the voltage vbe between the base and emitter of the forward direction that causes NPN transistor Q1 to be ON, the current I1, indicated in the diagram by the dotted line, flows from the emitter of the NPN transistor Q1 to the capacitor C1, and the capacitor C1 becomes charged. This prevents a drop in the voltage vn1 of the node 1, and the voltage vn1 is fixed at the clamp voltage vcp ($\approx$v1-vbe).

Meanwhile, if the voltage vn1 of the node 1 is higher than the clamp voltage vcp, the NPN transistor Q1 turns OFF, and the current charging the capacitor C1 is only the current I1 of the constant current circuit I1. Because the charge velocity of the capacitor C1, which is determined by this current I1 and the capacity of the capacitor C1, is set up to be slower than the voltage change velocity of the amplified signal S42 at the time of generating the peak, the current of the capacitor C1 based on the current I1 follows the changes in voltage, and the voltage of the node N1 increases by matching the changes of the amplified signal S42.

In this way, the amplified signal S42 is input, and the signal component is output through the buffer circuit BF of the bottom clamp circuit 43 while the capacitor C1 is charging so that the voltage of the node N1 does not drop below the clamp voltage vcp.

FIG. 4 is a diagram in order to explain the characteristics of the clamp circuit indicated in FIG. 3.

As a comparison for the purposes of explanation, FIG. 4a is a circuit that removes the NPN transistor Q1 the constant current circuit I1, and the constant voltage circuit V1 from the circuit of FIG. 3. The waveform of the signal S42 is indicated in FIG. 4b; and the waveform of the output signal S43' when the signal S42 is input into the circuit is indicated in FIG. 4c.

After a peak is generated in the signal S42, the level of the node N1' in the circuit of FIG. 4a fluctuates excessively until returning to the level prior to the generation of the peak as indicated in FIG. 4c. This is based on the differential characteristics of the capacitor C1. The amplitude of this fluctuation becomes larger the smaller the capacity of the capacitor C1, and the amplitude of this fluctuation becomes smaller the greater the capacity of the capacitor C1.

In the circuit of FIG. 4a, the bottom level vb of the node N1' becomes unstable because it is not a circuit that controls the charge accumulated in the capacitor C1. For this reason, it is not possible to conduct stable peak detection with a circuit that detects a peak by comparing the output signal S43 of this circuit with a direct reference level.

In contrast, as indicated in FIG. 4d, the bottom level vcp of the output signal S43 is kept constant by the bottom clamp circuit 43 indicated in FIG. 3. For this reason, it is possible to stabilize and compare the output of the bottom clamp circuit 43 and the reference level.

This completes the explanation of the bottom clamp circuit 43.

The low-pass filter 44 in FIG. 2 is a filter that receives the signal S43 from the bottom clamp circuit 43, and that attenuates the high frequency noise component not included in the specified signal pass band.

The comparator 45 compares the signal S44, from which the noise component was attenuated by the low-pass filter 44, with the reference voltage Vref output from the reference voltage source 46. The comparator 45 outputs a detection signal Sp of the logical value "1" when the level of the signal S44 exceeds that of the reference voltage Vref.

Next, the operation of a detection circuit 4 with the above composition will be explained by referring to FIG. 5.

FIG. 5 is a diagram indicating the various waveforms in the detection circuit 4 indicated in FIG. 2 in relation to the focal position of the laser light.

In FIG. 5, the vertical axis indicates the focal position in the depth direction of the surface of the optical disk; and the horizontal axis indicates time. As indicated in FIG. 5a, the focus of the laser light causes the focal position to move in the depth direction at a constant velocity.

The focal position L1 corresponds to the surface of the optical disk, and the focal position L2 corresponds to the recording layer. At the time that the focus reaches these positions, peak A and peak B are generated respectively in the received light signal Srf indicated in FIG. 5b.

The high frequency noise of these peaks A and B is attenuated by the low-pass filter 41; peak A is amplified by a gain of a level detectable by the amplifier 42; and this is input into the bottom clamp circuit 43 as the signal S42 indicated in FIG. 5c.

As indicated in FIG. 5d, the bottom level va of the signal S42 is converted into the bottom level vcp of the signal S44 by the bottom clamp circuit 43. This bottom level vcp is stabilized in the same way as the reference voltage Vref of the reference voltage source 46. Specifically, the clamp voltage Vcp of FIG. 5d and the reference voltage Vref are stably maintained such that there is always a fixed potential difference. In this way, it is possible to detect a stable signal (pulse) because a detection signal Sp is generated like that indicated in FIG. 5e, and the reference voltage Vref is compared with a high level signal S44 that is always a fixed potential from the bottom level vcp of the signal S44.

As explained above, according to the optical disk detection device 10 indicated in FIG. 1, when determining the type of optical disk corresponding to the depth from the surface of the plane on which the light beam is irradiated to the data recording layer, the actuator of the head unit 3 is servo-controlled corresponding to the control signal from the servo controller 6, and the light is irradiated while varying the focal position of the light beam in one direction of the depth direction from the surface of the optical disk. The light of this irradiated light that is reflected by the optical disk is received by the optical system of the head unit 3, and is converted into received light signals of a level corresponding to the intensity of the light that is received by the light detector.

The bottom level of this received light signal is clamped by the bottom clamp circuit 43 to become the specified clamp level vcp. The received light signal that has been clamped at the bottom level is compared with the specified reference voltage Vref by the comparator 45. A detection signal Sp of the logical value "1" is output from the comparator 45 corresponding to the results of the results of the comparison, and the generation of peaks (pulse signals) in the received light signal is determined.

When detection signals Sp of the logical value "1" are output, the difference between the focal positions is measured by the system controller 5 based on the multiple peaks (pulse signals) generated in conjunction with changes of the focal position. For example, the difference in focal positions can be detected by measuring the difference in time when the focal position is moved at a constant velocity and detection signals Sp of the logical value "1" are output. The type of optical disk can be determined based on this measured difference of focal positions.

Consequently, the noise margin when no peak (pulse signal) is generated becomes the level of the difference between the clamp level vcp and the reference voltage Vref. Because this noise margin is appreciably greater than that of a conventional circuit that only has a margin of about the input offset of the comparator, the peak (pulse signal) detection operation and the optical disk determination operation have improved stability.

In addition, the difference between the reference voltage Vref and the bottom level of the signal S44, which are compared by the comparator 45 that determines the peak (pulse signal), is always maintained at a constant. Therefore, even if, for example, the bottom level of the received signal input from the head unit 3 fluctuates based on the fluctuations of the received light signal, the peak (pulse signal) can be stably detected.

Moreover, the sensitivity of peak (pulse signal) detection is improved and the stability of optical disk detection is improved because the faint peak of the received light signal is amplified by the amplifier 42, which amplifies the received light signal that is input into the bottom clamp circuit 43 by a specified gain, and this is compared by the comparator 45.

In addition, the phenomenon, in which the logic of the comparator is reversed by the noise component included in the received light signal, can be prevented by the low-pass filter 41. The low-pass filter 41 attenuates the noise component of the specified band that is included in the received light signal. The noise-attenuated signal is input into the bottom clamp circuit 43, and the stability of the peak (pulse signal) detection operation and of the optical disk determination operation are improved.

The present invention is not limited to the form of embodiment described above.

For example, only one amplifier was inserted at a stage prior to the bottom clamp 43 in the block diagram indicated in FIG. 2, but this is not limited to one, and there may be two or more. Moreover, the position of inserting the amplifier is not limited to being just before the bottom clamp circuit 43, and may, for example, be inserted at a stage after the bottom clamp circuit 43.

In the block diagram indicated in FIG. 2, one low-pass filter is inserted before and one after the bottom clamp 43, but this is not limited to two, and there may be one or the other.

When determining the type of optical disk, the disk motor 2 of FIG. 2 may be stopped or rotating. If rotating, for example, the operational standby time of the device may be reduced because the system may move to the disk playback or record operations immediately after determining the type of optical disk.

The invention claimed is:

1. An optical disk determination circuit that determines the kind of optical disk by detecting the distance from the light beam irradiation plane to the data recording layer, comprising:

an input terminal that inputs received light signals, which correspond to the reflected light of a light beam, while the focal position changes in the depth direction of an optical disk;

a clamp circuit that clamps the bottom level of the received light signals at a specified level, and outputs this as a bottom level clamp signal;

a comparator circuit that detects a first reflection signal at the surface of the optical disk, and a second reflection signal at the recording layer of the optical disk by comparing the bottom level clamp signal with a reference voltage; and a calculation circuit that calculates the distance from the surface of the optical disk to the recording layer using the time difference between the first reflection signal and the second reflection signal based on said clamp signal.

2. An optical disk determination circuit described in claim 1, having:

a filter circuit that conducts specified signal processing in relation to the signals input from the input terminal; and an amplifier circuit that amplifies the output signals of the aforementioned filter circuit and outputs them to the aforementioned clamp circuit.

3. An optical disk determination circuit described in claim 2, having:

a filter circuit that conducts specified signal processing on the output signals of the clamp circuit.

4. An optical disk determination circuit described in claim 1 that determines whether an optical disk is a CD or a DVD corresponding to the distance from the surface of the optical disk to the recording layer.

* * * * *